No. 692,130. Patented Jan. 28, 1902.
J. W. FRIES.
CLUTCH FOR DRIVING MACHINERY.
(Application filed Oct. 15, 1901.)
(No Model.)
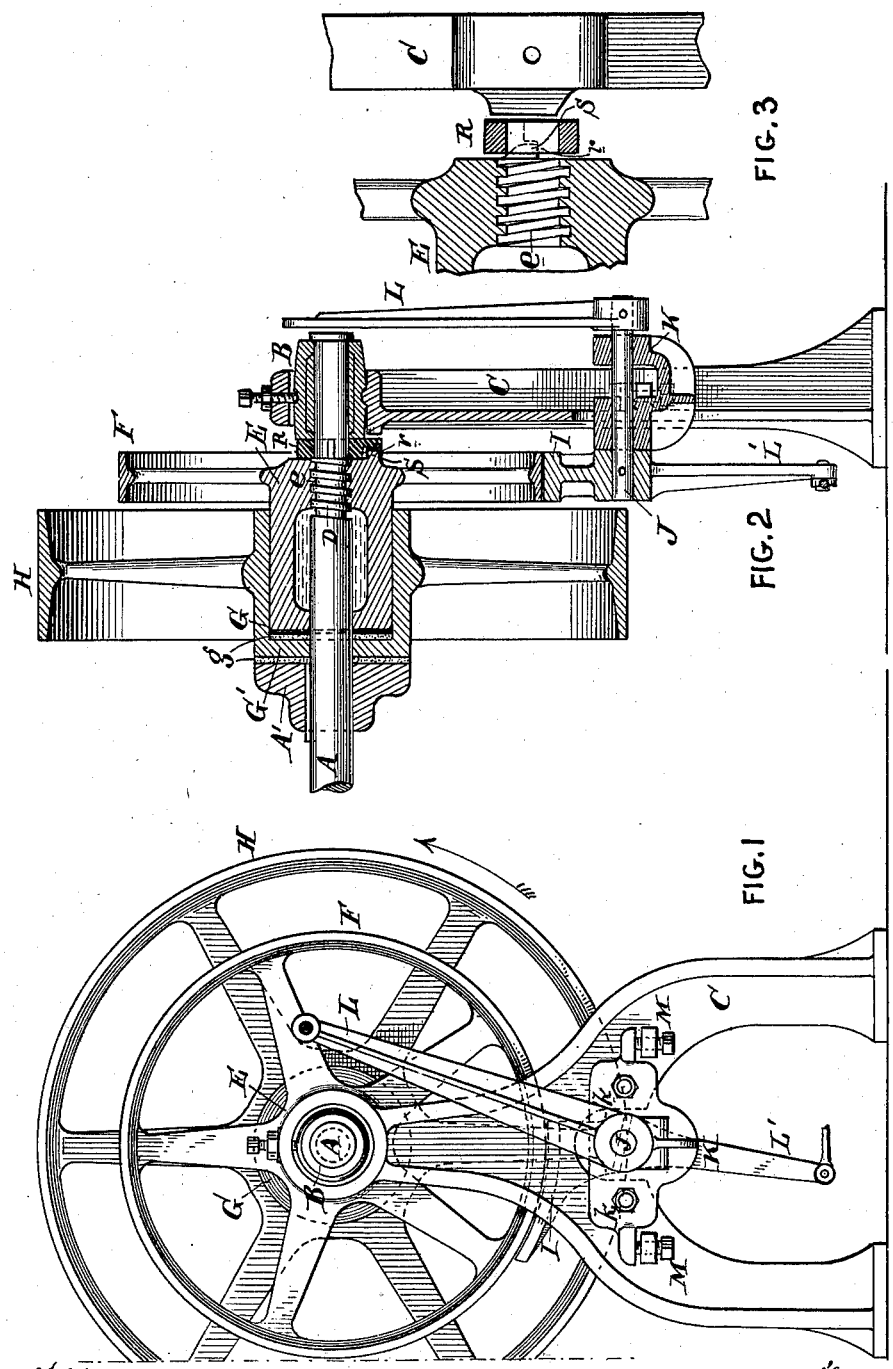
Attest
Inventor
John W. Fries
THE NORRIS PETERS CO., PHOTO-LITHO., WASHINGTON, D. C.

UNITED STATES PATENT OFFICE.

JOHN W. FRIES, OF WINSTON-SALEM, NORTH CAROLINA.

CLUTCH FOR DRIVING MACHINERY.

SPECIFICATION forming part of Letters Patent No. 692,130, dated January 28, 1902.

Application filed October 15, 1901. Serial No. 78,692. (No model.)

*To all whom it may concern:*

Be it known that I, JOHN W. FRIES, of Winston-Salem, county of Forsyth, State of North Carolina, have invented an Improvement in Clutches for Driving Machinery, of which the following is a specification.

My invention has reference to clutches for driving machinery; and it consists of certain improvements, all of which are fully set forth in the following specification and shown in the accompanying drawings, which form a part thereof.

The object of my invention is to provide a simple construction of clutch adapted for driving a shaft from a driving-pulley, whereby cheapness of construction combined with durability is secured.

My object is further to provide a construction which shall be quick in action and very positive in its operation.

In carrying out my invention I provide the driven shaft with a screw, upon which is loosely screwed the hub of a brake-pulley. Sleeved upon the hub of the brake-pulley is the hub of the driving-pulley, and the latter is also provided with an inwardly-directed flange adapted to be clamped between the end of the hub of the brake-pulley and a collar on the driven shaft. I further provide means for braking or arresting the rotation of the brake-pulley for the purpose of holding its hub and allowing the driven shaft to rotate in it, and thereby shift it longitudinally to release its grip upon the flange of driving-pulley hub when it is desired to arrest the driven shaft.

By simply releasing the brake-pulley it is caused to rotate upon the shaft by the action of the driving-pulley and caused to again clamp the flange of the driving-pulley hub.

My invention also comprehends many details of construction, and the said construction and mode of operation will be readily understood by reference to the drawings, in which—

Figure 1 is a front elevation of my improved clutch for driving machinery. Fig. 2 is a sectional elevation of same, and Fig. 3 is a sectional plan view of a portion of same.

C is the standard or pedestal and has a bearing B for the end of the driven shaft A. This shaft has a screw-thread D near its end, and upon it is screwed the hub E of the brake-wheel F. This hub E has screw-threads $e$ for receiving the screw D and is also made hollow for receiving a lubricant. The outer surface of this hub E is cylindrical and carries the hub G of the driving-wheel H. The hub G is provided with an inwardly-directed or annular flange G', which is adapted to be clamped between the collar A' on shaft A and the end of the brake-hub E. Leather washers $g$ may be interposed between the flange G' and the hub E and collar A', if so desired, to increase the gripping action to prevent the jamming of metal against metal and avoid all noise.

I is a brake-shoe adapted to arrest the rotation of the brake-wheel F and of hub E. This shoe is secured to a rock-shaft J, which may have a lever L to rock it and apply the brake-shoe to the periphery of the brake-wheel. I have also shown the brake-shoe I provided with a downwardly-extending arm L', which may be operated by any suitable connecting-bar leading to the place from which the clutch is to be controlled. The brake-shoe may be operated by either or both of these parts L and L'. The shaft J is journaled in a bearing-casting K, which is clamped to the pedestal C by screws $k$ and is adjustable vertically by screws M. By this means the action of the brake-shoe may be adjusted to compensate for wear.

To limit the longitudinal movement of the braking-hub E upon the shaft A, I prefer to provide the same with a collar R, against which the said hub may move when the clutch is released. To avoid jamming, and thereby rendering the liberation uncertain when the clutch is to be thrown into action, I prefer to provide the hub E with a lug S and the collar R with a shoulder $r$, which strikes against the lug S just in time to prevent the hub jamming against the face of the collar. By this construction it is evident that the apparatus is in condition for instantly re-clutching itself the moment the brake-shoe is removed, as then the friction of the hub G of the driving-wheel upon the hub E causes it to revolve upon the shaft A and screw endwise into clutching position. It is also evident that when the clutch is released by applying the brake-shoe I the shaft A may be quickly stopped from rotating by momentum by continuing to apply the brake. The same lever L therefore acts to release the clutch and to brake the rotation of the driven shaft.

It is evident that while I have shown the pedestal C as supported upon the floor it may be secured to the ceiling or wall or to any machine on which the clutch is to be used.

While I prefer the construction shown as being excellently adapted to my invention, I do not confine myself to the minor details thereof, as they may be modified without departing from the spirit of the invention.

Having now described my invention, what I claim as new, and desire to secure by Letters Patent, is—

1. In a clutch, the combination of the driven shaft having a screw, a brake-hub sleeved upon the shaft and internally screw-threaded acting as a nut to the screw thereof, a driving-wheel sleeved upon the brake-hub and adapted to be clamped to the driven shaft by the brake-hub, and means to retard the rotation of the brake-hub.

2. In a clutch, the combination of the driven shaft having a screw, a brake-hub sleeved upon the shaft and internally screw-threaded acting as a nut to the screw thereof, a driving-wheel sleeved upon the brake-hub and adapted to be clamped to the driven shaft by the brake-hub, means to retard the rotation of the brake-hub consisting of a brake-wheel secured to the brake-hub, and a brake to create a friction upon the brake-wheel.

3. In a clutch, the combination of the driven shaft having a screw, a brake-hub sleeved upon the shaft and internally screw-threaded acting as a nut to the screw thereof, a driving-wheel sleeved upon the brake-hub and adapted to be clamped to the driven shaft by the brake-hub, means to retard the rotation of the brake-hub consisting of a brake-wheel secured to the hub, a brake-shoe to press upon the brake-wheel, and a lever to move the brake-shoe against the brake-wheel.

4. In a clutch, the combination of the driven shaft having a screw, a brake-hub sleeved upon the shaft and internally screw-threaded acting as a nut to the screw thereof, a driving-wheel sleeved upon the brake-hub and adapted to be clamped to the driven shaft by the brake-hub, means to retard the rotation of the brake-hub consisting of a brake-wheel secured to the hub, a brake-shoe to press upon the brake-wheel, a rock-shaft secured to the brake-shoe, an adjustable bearing for the rock-shaft to adjust the brake-shoe to or from the brake-wheel, and a lever secured to the rock-shaft to move the brake-shoe against the brake-wheel.

5. In a clutch, the combination of the driven shaft having a screw, a brake-hub sleeved upon the shaft and internally screw-threaded acting as a nut to the screw thereof, a driving-wheel sleeved upon the brake-hub and adapted to be clamped to the driven shaft by the brake-hub, a stop to arrest the rotation of the brake-hub upon the driven shaft when it has freed the driving-wheel, and means to retard the rotation of the brake-hub.

6. In a clutch, the combination of the driven shaft having a screw, a brake-hub sleeved upon the shaft and internally screw-threaded acting as a nut to the screw thereof and having a lug S, a collar R secured to the driven shaft and having a shoulder $r$ acting as a stop for the lug of the brake-hub, a driving-wheel sleeved upon the brake-hub and adapted to be clamped to the driven shaft by the brake-hub, and means to retard or arrest the rotation of the brake-hub and driven shaft.

7. In a clutch, the combination of the driven shaft having a screw, a brake-hub sleeved upon the shaft and internally screw-threaded acting as a nut to the screw thereof and having a clamping end, a driving-wheel sleeved upon the brake-hub and provided with an annular flange G' adapted to be clamped to the driven shaft by the brake-hub, and means to retard the rotation of the brake-hub.

8. In a clutch, the combination of a driving member, a driven member, an intermediate member for clutching the driving member to the driven member adapted to be rotated upon the driven member by the driving member and connected with the driven member by a screw to shift it into or out of clutching action, and externally-controlled means for retarding the rotation of the intermediate or clutching member whereby the driven member is caused to shift it under screw action to release the driving member.

9. In a clutch, the combination of a driving member, a driven member, an intermediate member for clutching the driving member to the driven member adapted to be rotated upon the driven member by the driving member and connected with the driven member by a screw to shift it into or out of clutching action, externally-controlled means for retarding the rotation of the intermediate or clutching member whereby the driven member is caused to shift it under screw action to release the driving member, and a stop to limit the rotation of the driven member in the intermediate member.

10. In a clutch, the combination of the standard, a driven shaft journaled in said standard and having a clutch-flange A' and a screw D, a brake-hub E carried by the shaft and having screw-threads adapted to the screw thereof and having the brake-wheel F, a driving-hub G sleeved upon the brake-hub and having an annular clutch-flange G' and a driving-rim such as a pulley, a brake-shoe I acting upon the brake-wheel, and means for applying said brake-shoe.

11. In a clutch, the combination of the standard, a driven shaft journaled in said standard and having a clutch-flange A' a collar R having a stop $r$ and a screw D, a brake-hub E carried by the shaft and having screw-threads adapted to the screw thereof and having the brake-wheel F and stop-lug S, a driving-hub G sleeved upon the brake-hub and having an annular clutch-flange G' and a driving-rim such as a pulley, a brake-shoe I acting upon the brake-wheel, and lever mechanism for applying said brake-shoe.

In testimony of which invention I have hereunto set my hand.

JOHN W. FRIES.

Witnesses:
  C. T. PFOHL,
  A. F. PFOHL.